United States Patent [19]

Chen

[11] Patent Number: 4,900,117

[45] Date of Patent: Feb. 13, 1990

[54] ROTARY OPTICAL COUPLER UTILIZING CYLINDRICAL RINGSHAPED MIRRORS AND METHOD OF MAKING SAME

[76] Inventor: Linus T. Chen, 479 Hillsborough St., Thousand Oaks, Calif. 91361

[21] Appl. No.: 312,823

[22] Filed: Feb. 21, 1989

[51] Int. Cl.[4] .................................................. G02B 6/26
[52] U.S. Cl. ............................. 350/96.15; 350/96.10; 350/96.20; 350/96.22; 350/320; 350/616; 350/636; 250/227
[58] Field of Search ............... 350/96.10, 96.15, 96.16, 350/96.20, 96.22, 320, 616, 632, 636; 250/227

[56] References Cited

U.S. PATENT DOCUMENTS

| | | | |
|---|---|---|---|
| 3,541,825 | 11/1970 | Reader et al. | 350/320 X |
| 4,027,945 | 6/1977 | Iverson | 350/96.22 X |
| 4,109,997 | 8/1978 | Iverson | 350/96.15 X |
| 4,352,550 | 10/1982 | Uchida | 350/96.20 |
| 4,401,360 | 8/1983 | Streckmann et al. | 350/96.15 |
| 4,436,367 | 3/1984 | Lewis et al. | 350/96.20 |
| 4,504,111 | 3/1985 | Hunzinger | 350/96.20 |
| 4,519,670 | 5/1985 | Spinner et al. | 350/96.15 |
| 4,525,025 | 6/1985 | Hohmann et al. | 350/96.15 |
| 4,530,567 | 7/1985 | Simon | 350/96.20 |
| 4,602,854 | 7/1986 | Baker | 350/616 |
| 4,641,915 | 2/1987 | Asakawa et al. | 350/96.18 |
| 4,711,516 | 12/1987 | Graber | 350/96.15 |
| 4,725,116 | 2/1988 | Spencer et al. | 350/96.20 |

FOREIGN PATENT DOCUMENTS

| | | | |
|---|---|---|---|
| 60-45208 | 3/1985 | Japan | 350/96.20 X |
| 60-67909 | 4/1985 | Japan | 350/96.20 X |
| 60-91308 | 5/1985 | Japan | 350/96.15 X |
| 2163617 | 2/1986 | United Kingdom | 350/96.15 X |
| 2179173 | 2/1987 | United Kingdom | 350/96.15 X |

Primary Examiner—William Sikes
Assistant Examiner—Brian M. Healy
Attorney, Agent, or Firm—Henry M. Bissell

[57] ABSTRACT

A rotary optical coupler is capable of providing continuous, bi-directional, multiple optical links between two objects in relative rotation to each other. The coupler comprises two parts, a rotor and a stator, both of which are constructed similarly. Each part has circular tracks of selectively angled reflectors which project light beams to corresponding receptors during relative rotation with the other part. In this manner are the optical links achieved.

26 Claims, 3 Drawing Sheets

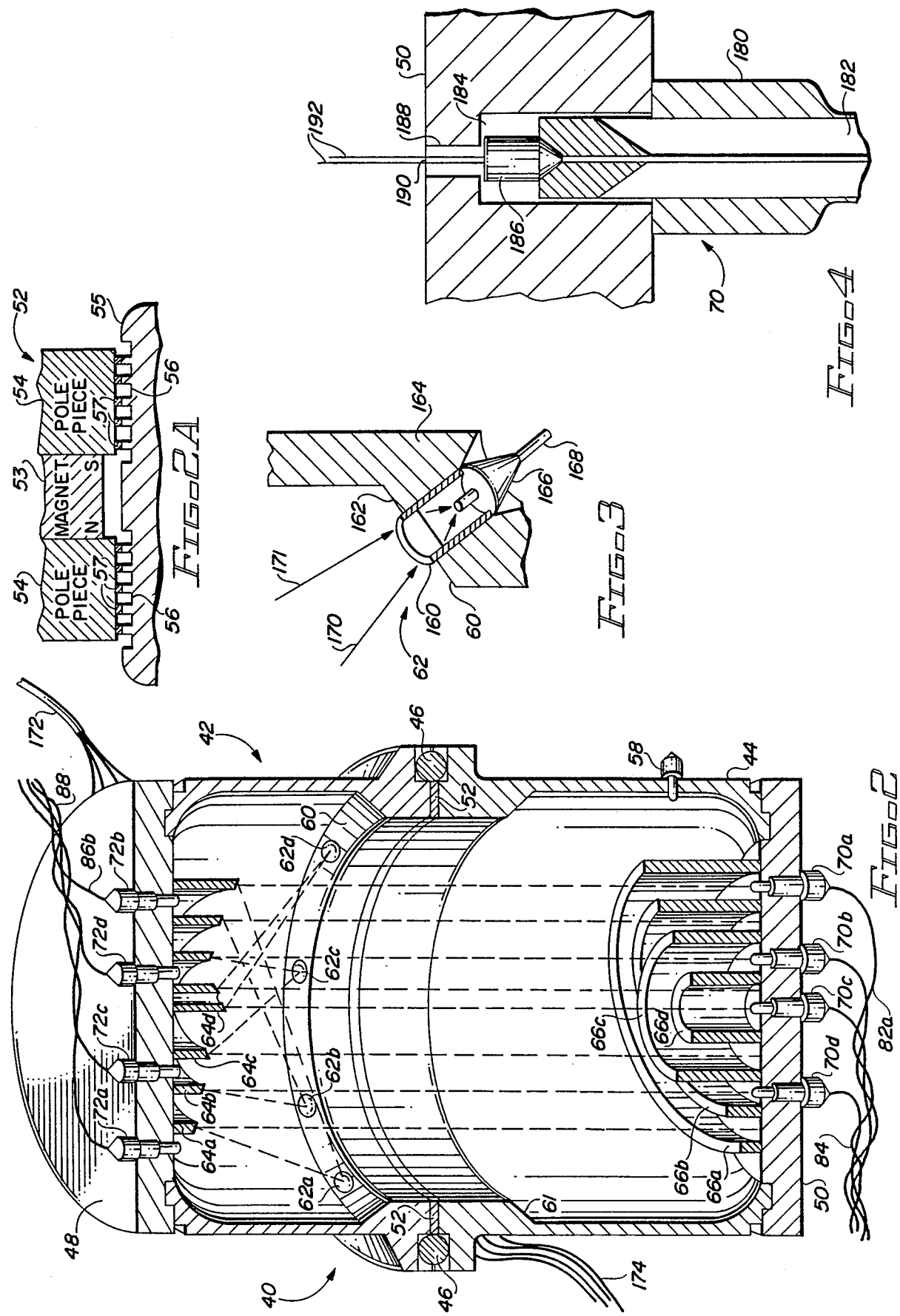

ROTARY OPTICAL COUPLER UTILIZING CYLINDRICAL RINGSHAPED MIRRORS AND METHOD OF MAKING SAME

BACKGROUND OF THE INVENTION

1. Field of the Invention

This invention relates to apparatus for transferring signals between bodies undergoing relative rotation with respect to each other and, more particulary, to non-contacting optical couplers having the capability of transferring light signals.

2. Description of the Related Art

Mechanical couplers for transferring electrical current from a rotating body to a non-rotating body are well known in the art. Typically, a conducting ring on one body is contacted by one or more conducting brushes on the other body. Electric current flows from one body through the ring to the brush and then to the other body. This mechanical arrangement is subject to wear and creates electrical noise which may obscure the signals being transmitted. Mechanical couplers are often limited by their limited bandwidths and useful life expectancies. Optical couplers, on the other hand, may be composed of non-contacting mechanisms and are subject to virtually none of the bandwidth limits inherent in mechanical couplers.

Existing optical coupler mechanisms are limited in at least one of the following ways:

a. Low efficiency caused by multiple optical reflections and multiple boundaries of the optical coupler interface.
 b. Signal intensity modulation from rotary motion (the change of relative position between transmitters and receivers).
 c. Inability to support multiple numbers of rings.
 d. Poor signal noise ratio which results in the device being unacceptable for analog signal linkage.

One example of optical couplers in the prior art is disclosed in patents 4,027,905 and 4,109,997 of Myren L. Iverson. The optical couplers of that patented arrangement have two light-carrying members, one attached to a rotating body and one attached to a stationary body. The light carrying members are bundles of optical fibers which are placed end to end coaxially with the axis of rotation. Light introduced into one bundle travels to the opposite end where it couples across a small gap into the second bundle. Since a gap exists between bundle ends, no physical contact is made. Multichannel bundles may be used where the channels of the coupled ends are each formed into concentric circles separated by opaque material. If discrete signal channels are to be incorporated in the bundles, this construction presents severe alignment requirements. Moreover, signal losses are inherent in this design configuration.

Other variations of optical couplers which are known in the art incorporate a series of fiber optic channels concentrically placed about a waveguide for the transfer of both light signals and microwaves from one body to the other. Still others utilize a de-rotating prism arranged to rotate at one-half the relative rotational speed between the two bodies. The de-rotating prism, arranged in this fashion, enables collimated light from a fixed light source on one body to be transmitted onto a fixed light detector on the other body. Still another variation uses concentric annular mirrors within a toroid which has a transparent circumferential window. Light signals from one body are projected through the circumferential window and into the toroid where they reflect back until they strike an angled mirror and are deflected out of the toroid. The toroid is attached to one body, and the light projecting means is attached to the other body. All of these designs incorporate complex structural configurations which are difficult and costly to fabricate with the mechanical precision required for effective coupling of signals between optical fibers. In addition, some of these designs are inherently lossy in the transmission of the coupled signals.

The design of the present invention minimizes or eliminates the problems outlined above. Since only a single reflection is necessary between transmitters and receivers, reflectivity may be consistently held above 99.9%. Other advantages of the present invention are:

1. Hard vacuum can be realized. Troublesome condensation, particles such as dust, and reactive gas cannot enter the unit.
2. The coupler bearing is the only hard moving part. No drive gear or belt is required.
3. By nature of the coupling mechanism, there is no backlash to cause alignment problems.
4. The relatively bulky transmitters and receivers can be freely spaced on designated mounting areas without additional mounting parts. This can translate to significant reductions in size and cost.

It is the combination of these advantages that make this invention producible, practical and usable.

SUMMARY OF THE INVENTION

In brief, arrangements in accordance with the present invention utilize a rotary optical coupler which is capable of providing continuous, bi-directional multiple optical links between two objects in relative rotation with each other. The basic coupler combination comprises two parts, a rotor and a stator, both of which are of similar construction. In two different embodiments, the coupler uses circular tracks of paraboloidal or ellipsoidal reflective surfaces to converge beams in circular motion to a point, line, or geometric pattern. The principles used in this instance are those for a reflective paraboloidal surface: beams parallel to the paraboloid's central axis will be reflected to a single point. For a reflective ellipsoidal surface, beams from a theoretical point focus will be reflected to a second focal point.

In general, the coupler consists of two components, a stator and rotor, joined by bearings and in relative rotation to one another. Each stator (or rotor) is similar in shape to a cylinder with one solid face and one open face. The open faces of the stator and rotor are joined with an aligned rotational interface to form a larger, closed cylinder which may be rotated at the middle. Ferrofluidic seals, which perform a function similar to that of an O-ring in a static interface, can be used at the joint to prevent dust and moisture entry. With the proper choice of seal, the rotary optical coupler can be sealed to a hard vacuum or purged with dry and clean inert gas. The rotational interface may be ball, roller, or fluid bearing. Dual bearings or needle roller bearings may be used for stiff axial alignment. Along the walls of both the stator and rotor near the interface are located various light receptors or receivers. Mounted on the closed faces of the rotor and stator are concentric circular tracks whose surfaces, in one particular embodiment, are paraboloidal in form. Also mounted on the closed faces between the tracks at opposite ends of the cylinder are various transmitters (each at a different radius from the central axis) directed at the circular tracks of the opposite face.

Source light beams parallel to the axis of the cylinder may be emitted from both the stator and rotor. Each light beam emitted from the stator will be reflected from tracks on the opposite face (of the rotor) onto its individual receiver located on the wall of the rotor. Conversely, light from the rotor will be reflected by tracks on the face of the stator to receivers on the wall of the stator. The radial or axial play of the relative stator and rotor positions will not affect the location of the focal point.

As the rotor turns relative to the stator, the collimated light from the transmitters on the face of the rotor continues to strike the same circular track on the opposite face of the stator. Because the surfaces of the tracks are paraboloidal in shape, the transmitted light will always be reflected to the same point (where the receiver would be located) on the wall of the stator. As may be easily deduced, the stator is also in relative rotation to the rotor, and transmissions from the stator will be reflected from tracks on the rotor always to the same receiver point on the wall of the rotor.

Thus, although the stator and rotor may turn in opposition to each other, their communications may be operative continuously. For each signal, only a single beam and a single reflection are required to complete the link. The result is a very highly efficient optical coupling.

Light beams may be generated by light sources which are located outside and/or inside the coupler. Outside light beams may be directed through air by lenses and reflectors or may be guided via optical waveguides, such as optical tubing, rod, fibers, integrated glass chip with light guides, etc. Likewise, receivers may be detectors/sensors that are located outside and/or inside the coupler. The beams may be guided in accordance with the methods described hereinabove.

A second embodiment uses ellipsoidal surfaces instead of paraboloidal surfaces to achieve like results but without certain modulation effects which may develop from use of the first embodiment.

BRIEF DESCRIPTION OF THE DRAWING

A better understanding of the present invention may be realized from a consideration of the following detailed description, taken in conjunction with the accompanying drawing in which:

FIG. 2 is a sectional schematic view of one particular arrangement in accordance with the invention;

FIG. 2A is a diagram of a portion of the arrangement of FIG. 2;

FIG. 3 is a cutaway view of a portion of FIG. 2 showing further details thereof;

FIG. 4 is a cutaway view of another portion of FIG. 2 showing further details thereof;

DESCRIPTION OF THE PREFERRED EMBODIMENTS

For ease of understanding, it may be helpful to review certain principles of analytic geometry. A parabola may be defined as the locus of a point that moves in such a way that its undirected distances from a fixed point and a fixed line are equal. The fixed point is called the focus and the fixed line is the directrix of the parabola.

A parabola has a multitude of scientific applications. For example, the path of a projectile from a gun or a ballistic missile is a parabola (neglecting slight deviations due to air resistance). Certain types of bridge construction employ parabolic arches. Theoretically the curve of a suspension-bridge cable is approximately a parabola if the load is distributed uniformly along the horizontal roadbed.

If a parabola be rotated about its axis a surface called a paraboloid is generated. This surface is used as a reflector in automobile headlights, search lights and the like because of the property of the parabola/paraboloid that at any point on the curve, a line directed to the focus and a line parallel to the axis make equal angles with the tangent to the curve at that point. Consequently, the light rays from a source of light placed at the focus are all reflected parallel to the axis, thus throwing a cylindrical beam of light along the axis. The same principle is used in the reverse sense in a reflecting telescope: if the axis of a parabolic mirror is pointed toward a star, the rays from the star, upon striking the mirror, will all be reflected to the focus.

These principles are utilized in one preferred embodiment of the present invention which employs a plurality of paraboloid segments in a rotatable mechanism to cause the reflection of a fixed light beam along a path which follows a relatively rotating receiver, thereby always directing the reflected beam to that specific receiver, regardless of its position about a 360 degree peripheral path.

Figure 1A:
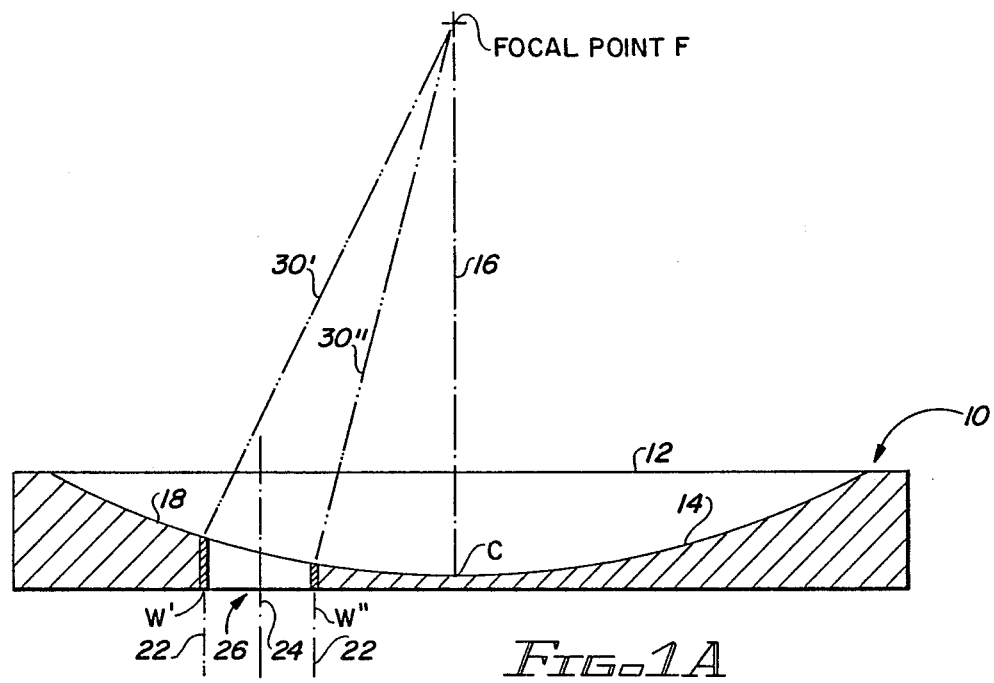
FIGS. 1A and 1B are, respectively, side sectional and plan views of a geometric figure which is used in illustrating certain basic principles of the present invention.
Figure 1B:
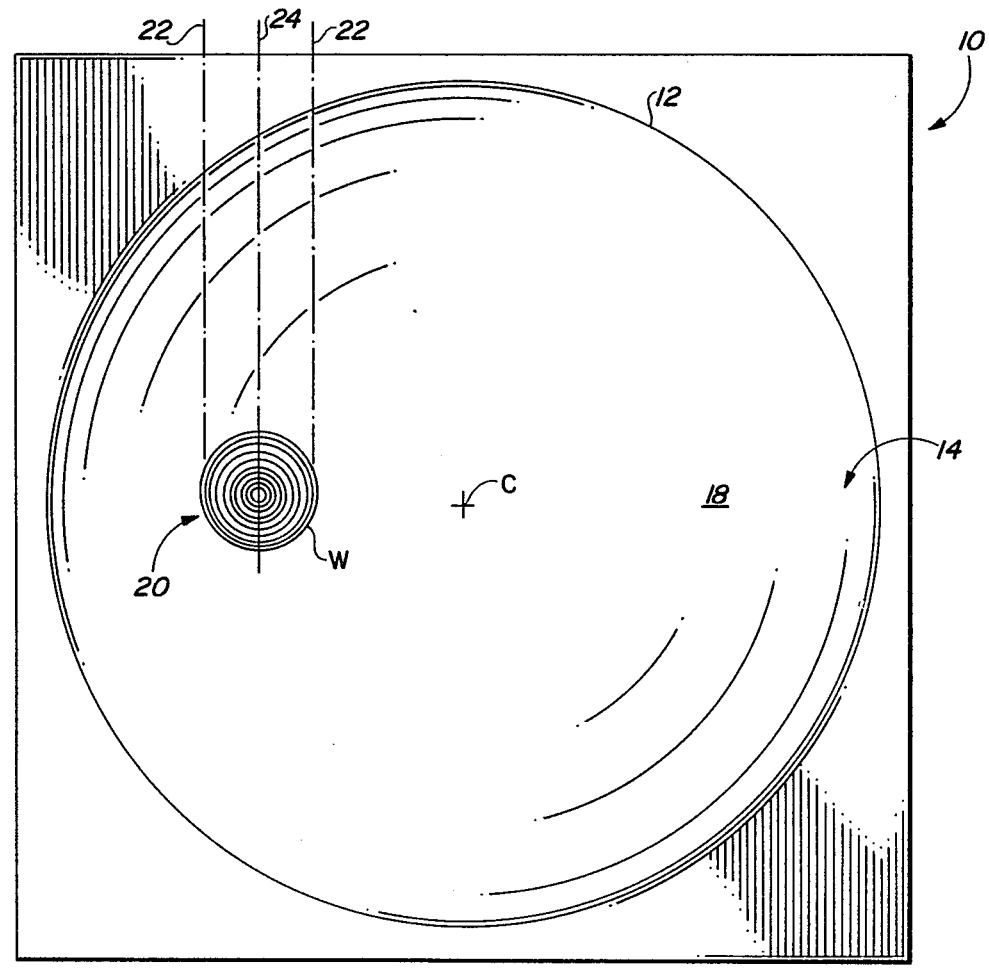

FIGS. 1A and 1B are presented to illustrate the adaptation of the principles of parabolic reflection to embodiments of the present invention. FIGS. 1A and 1B are, respectively, side sectional and plan views of a block 10 from which material has been removed or the block has been otherwise shaped to develop a parabolic dish 12. The inner concave surface of the dish 12 is in the form of a paraboloid 14 having a center C and a focal point F. The broken line 16 represents the central axis of the paraboloid 14. A reflective coating 18 is provided on the paraboloid surface 14. All incident light beams parallel to the central axis 16 are reflected by the reflective surface 18 and directed to the focal point F.

A set 20 of right circular cylindrical segments is shown in FIG. 1B between the dashed lines 22. These segments ("rings") are concentrically positioned about the dot/dash line 24 and are represented as having been carved out of the block 10 in the blank region 26. Only the outermost segment W is shown in cross section in FIG. 1A for purposes of illustration. The sectional view of the outer segment W is shown with walls designated W' and W''. It will be understood that the carved out circular segment W (as well as the others) has a section of reflective surface 18 extending about its upper edge. As shown in FIG. 1A, light beams parallel to the central axis 16 which reflect off these upper edges of the cylindrical segment W are directed to the focal point F, as represented by the lines 30', 30". It will be understood, however, that these lines 30 are but the edges of a hollow cone of light which is directed to the focal point F from the upper edge of the cylindrical wall or segment W from incident light parallel to the axis 16. That is, any beam of light parallel to the axis 16 which is directed to any point on the upper edge of the segment W will be directed to the same point, which in FIG. 1A is the focal point F.

Now visualize that the circular segment W is rotated about its own central axis 24. The same principle of reflection still applies—a light beam which is parallel to the central axis 16 of the paraboloid 14 and incident at any point on the upper edge of the segment W will be reflected to a common focal point. However, because of the rotation of the segment W, the location of that point will be shifted from the focal point F of the paraboloid surface 14. If the ten concentric circles in the set 20 are rotated by different amounts—say 360/10 or 36n degrees, where n is an integer from 1 to 10— a series of focal points every 36 degrees about a peripheral surface will be developed. Light receptors may be located at these sequential focal points to receive light reflected from the angle-shifted cylindrical segments of the set 20.

The number of right circular cylindrical segments to be fabricated from a paraboloid block such as that in FIGS. 1A, 1B may be chosen in accordance with design requirements and objectives. The number of ten block segments in the example described is purely arbitrary and was selected for purposes of illustration.

FIG. 2 is a half-sectional schematic view of a first preferred embodiment of a rotary optical coupler of the invention. FIG. 2 shows a coupler 40 comprising two major components, a stator 42 and a rotor 44, joined by bearings 46 and positioned for relative rotation with one another. Each component 42, 44 is generally cylindrical shaped with one solid end plate 48 or 50. The two components 42, 44 constitute an aligned rotational interface such that a larger closed overall cylinder is formed which may be rotated at the middle. The rotational interface is shown comprising ball bearings such as the bearings 46. A ferrofluidic seal is used at the innermost portion of the rotational interface. It will keep out particles which may be generated by bearing wear, dust and moisture. With enough stages of this type of seal, a hard vacuum can be maintained. An alternative to the hard vacuum is to purge the rotary optical coupler internal space with dry and clean inert gas.

One design of this type of seal is shown in the sketch of FIG. 2A. This type of seal is commercially available. Details of the design may vary; however, the principles of operation are the same.

Figure 6:
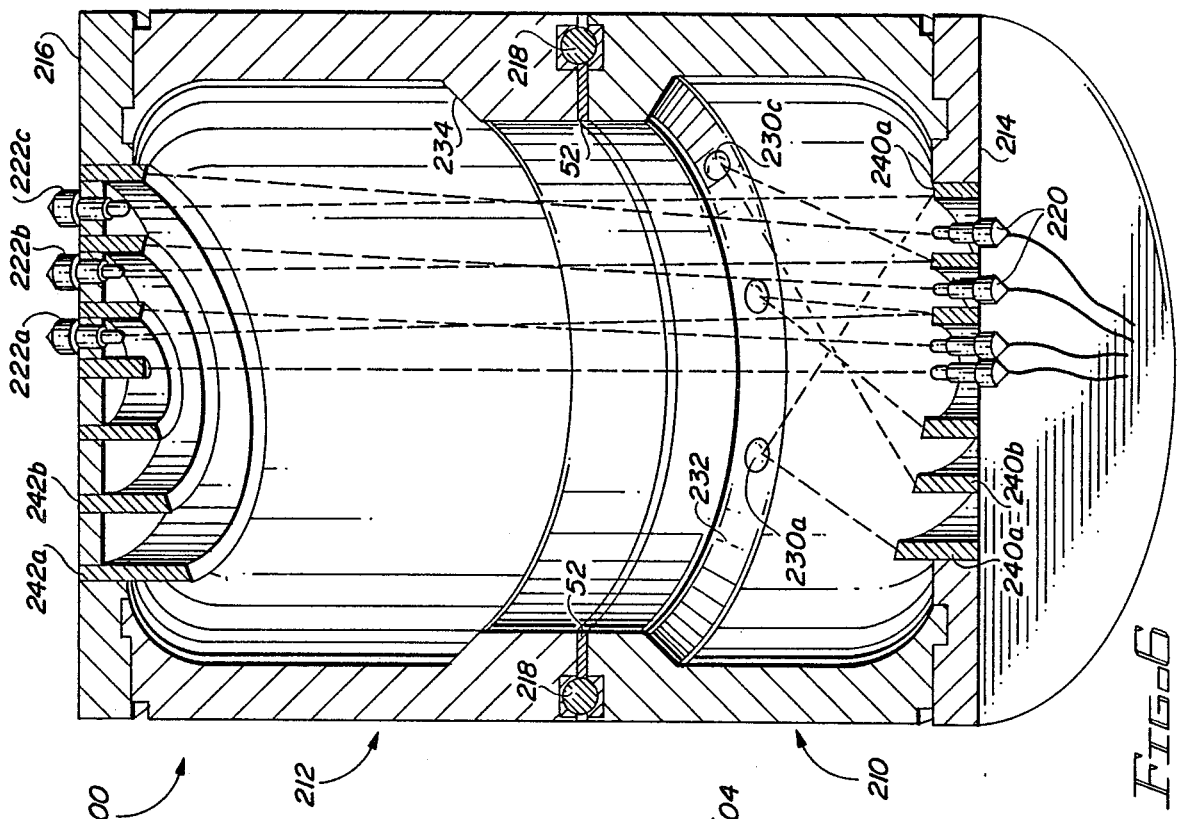
FIG. 6 is a schematic representation similar to that of FIG. 2 showing the structural configuration of a second embodiment of the present invention.

The ferrofluidic seal, designated by the reference numeral 52 in FIGS. 2 and 6, is shown in FIG. 2A as comprising a magnet 53, oriented as indicated, with a pair of pole pieces 54 at opposite poles of the magnet. The other side of the interface, 55 in FIG. 2A, has a pair of segments 56 which are situated opposite the two pole pieces 54. The interface element 55 comprises a magnetically permeable material. A magnetic or "ferrofluid" member, indicated by the black elements designated 57 in FIG. 2A, assumes the positions as shown under the influence of the magnetic fields established by the permanent magnet. In this arrangement, the labyrinthine or comb-shaped segments in conjunction with the remainder of the magnetic structure constitutes a multistage structure. This magnetic structure, completed by the pole pieces and the magnetically permeable interface, concentrates magnetic flux in the radial gap in each stage. In the ideal situation, all flux lines are confined under a stage and none are in the interstage region. The ferrofluid is trapped and held in each stage, forming a series of "liquid O-rings" with intervening regions that are filled with air. Each stage can typically sustain a pressure differential of 0.2 atmospheres. All stages act in series to provide a total pressure capability for the seal. Such seals are commercially available devices and may be obtained from Ferrofluidics Corporation of Nashua, N.H. This particular design is used for purposes of illustration and is not to be considered as limiting the scope of the ferrofluidic seal employed in the present invention.

Each of the two segments 42, 44 is provided with a peripheral ledge 60 or 61 on which are located at generally equidistant intervals the optical receivers such as 62. A separate receiver 62 is provided for each of the cylindrical segments 64 which are mounted in the flat plate end 48 of the stator 42. The segments 64, 66 are formed in the manner described for the set 20 of concentric elements shown in FIG. 1B, with alternative ones of the segments being placed in the opposite portion 44 of the coupler 40. Thus, the outer ring segment 64 of the stator 42 is taken from between the set of ring segments 66a, 66b of the rotor 44; the ring segment 64b of the stator 42 is taken from between the ring segments 66b, 66c, etc.

In place of the removed ring segments 64, a plurality of optical radiation source elements 70 are situated. These elements 70 are positioned in the base plate 50 of the rotor 44 so as to direct a collimated beam parallel to the central axis of the coupler device 40 at the opposite ring segment 64. For simplification of presentaton in a FIG. 2, the elements 70 are shown aligned in the face of the sectional portion of the end plate 50, although it will be understood that these may be displaced within the end plate at any angular offset desired. Each element 70 produces a light beam emanating therefrom and directed parallel to the axis of the device 40 to be incident on the ring segment 64 which is opposite the particular element 70. Thus the beam from source 70a impinges on ring 64a, light from source 70b impinges ring 64b, etc. and is reflected to receivers 62a, 62b, 62c and 62d, respectively. Similarly, light from sources 72a-d is directed to rings 66a-d and then reflected to corresponding receivers (not visible) in the ledge 61 in the wall of the rotor 44.

Eight light beam representations are indicated in FIG. 2, one for each of the elements 70 as depicted and another one for the position of the same element 70 as if rotated by 180 degrees. The result is two lines leading to each individual receptor 62, representing light beams reflected from the two 180 degree positions of the elements 70.

Details of the structure of a receiver 62 are shown in FIG. 3. These comprise a receiver lens 160 installed at the inlet end of a sheath or collar 162 which is mounted in an opening in the wall 164 at the location of the ledge portion 60. At the other end of the sheath 162 is a connector 166 which mounts one end of an optical fiber 168. Light beams from the reflective tracks, indicated by the arrows 170, 171 enter the receiver lens 160 whe they are focused to a narrow beam which is directed to the adjacent end of the fiber 168. The fibers 168 from the plurality of receivers 62 are gathered into a bundle 172 (FIG. 2) and led out of the device. As mentioned previously, waveguides may be used or not, depending on whether or not the transmitters and/or receivers are outside or inside the coupler unit. Optical fibers are only one form of the waveguide which may be used. Fiber waveguide is used in this detailed description for purposes of illustration only and is not to be considered as limiting the scope of the invention. A vacuum/purge port 58 is shown on the wall of the chamber 44. A similar arrangement is used for corresponding receivers in the rotor 44 (not visible in FIG. 2) which are mounted along a corresponding ledge 61. Optical fiber bundle 174 from these receivers is shown in FIG. 2.

Details of the structure of a light source such as 70 are shown in FIG. 4. The light sources 70 are installed in the base plate 50 and comprise a standard fiber optic connector 180 which is mounted on the end of the optical fiber 182. Within the bore 184 in the base plate 50 which receives the end of the optical fiber 182 is collimating lens 186. A second bore 188 of reduced diameter transmits light from the collimating lens 166 to a narrowed exit opening 190. The diameter of this opening 190 is controlled to match the diameter of the first dark ring of the light emission pattern, thus reducing the amount of refraction in the light beam (indicated by the arrows 192) which exits the opening 190. The inside wall of the bore 188 is black in color in order to absorb any scattered light from the collimating lens 186.

Figure 5:
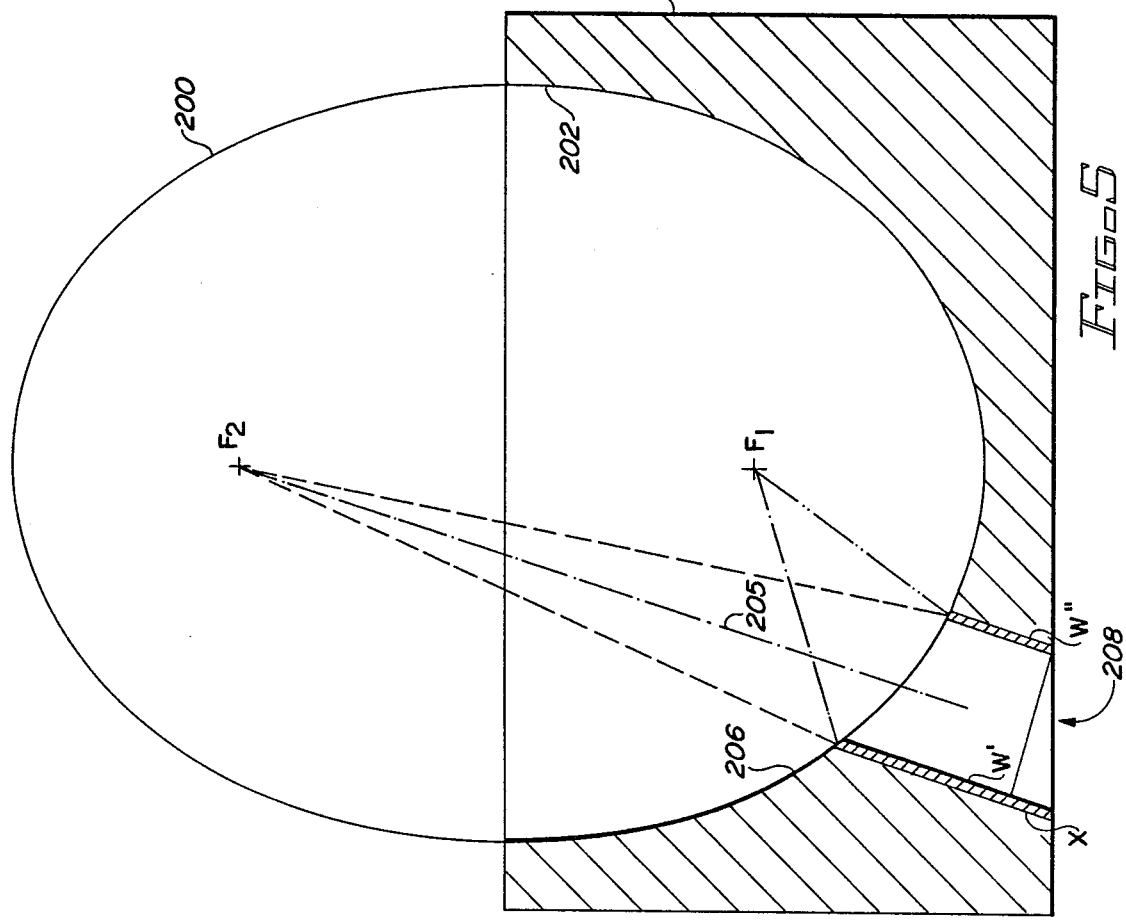
FIG. 5 is a diagram like FIG. 1A of a different geometric figure, indicating the fabrication of the reflective surface elements of a second embodiment of the invention.

FIG. 5 is presented for the purpose of illustrating the principles of the present invention as applied to the use of ellipsoidal reflecting surfaces. FIG. 5 shows an ellipse 200, one-half of which constitutes the inner concave surface 202 of a block 204 which has been carved to develop the ellipsoidal surface.

An ellipse is defined as the locus of a point which moves so that the sum of its undirected distances from two fixed points is a constant. These points are the two foci of the ellipse and are shown as $F_1$ and $F_2$ in FIG. 5. The foci lie along the major axis of the ellipse. A light beam from one of the foci ($F_2$ in FIG. 5) is reflected off the reflective coating 206 of the interior surface 204 and directed at the other focus, $F_1$. As before, the walls W' and W'' represent a segment cut from the block 204 as a right circular cylinder. However, in this instance the cut is made with the cylinder walls parallel to an axis 205 projected through the focus $F_2$. The lower portion x is milled away to enable the rings to be mounted in the attitude shown in FIG. 6 with rotation of the rings 208 as described in conjunction with FIG. 2. This will serve to direct reflected light to a corresponding receiver 230 in FIG. 6. Incident light on the reflective edges of this cylindrical segment 208, represented by the dashed lines of FIG. 5, is reflected and directed along the paths indicated by the dot/dash lines to the focal point $F_1$.

A second preferred embodiment of the invention making use of ellipsoidal reflectors is represented schematically in FIG. 6. FIG. 6 shows a rotor 210 and stator 212 constructed with end plates 214, 216 and a bearing 218 in a manner similar to that described with respect to FIG. 2.

Each of the end plates 214, 216 contains a plurality of light source elements 220, 222 which correspond to the element 70 as shown in FIG. 4. However, in the embodiment of FIG. 6, these light elements 220, 222 are installed at a slight angle to the axis of the rotary optical link 200 so that the light beam therefrom has a slight angle, relative to the axis. This corresponds to the angle which would exist if the source of the light beam were actually located at the focal point $F_2$ of the ellipse. It will be understood that in the diagram of FIG. 6, the focal point $F_2$ is located outside the structure.

A plurality of optical receivers 230 are shown mounted on a ledge 232 in the wall of the rotor 210. These correspond in structure to the optical receiver 62 of FIG. 3. A corresponding set of optical receivers (not visible in FIG. 6) is located along the ledge 234 of the stator 212.

A plurality of ring segments 240, cut in the manner indicated in FIG. 5, is mounted in the base plate 214 of the stator 210. Similarly, a second plurality of rings 242 is mounted on the base plate 216 of the stator 212. These ring segments 240, 242 are shifted about their central axis in the manner described for the first embodiment. From the schematic representation shown in FIG. 6, it will be understood that light from sources 220 or 222 in one end of the device 200 will be reflected from rings in the opposite end of the device and directed to optical receivers in the other half of the rotary optical link. Thus, for example, light from the source element 222C is directed at the cylindrical ring 240A and is reflected off the edge surface thereof to the receiver 230a. This will occur, no matter what the angle of rotation of the rotor 210 relative to the stator 212 by virtue of the reflective properties and the angles developed for the edge surfaces of the ellipsoidal segment rings and the angular shifted positions of the rings.

The use of the paraboloid surfaces of the first embodiment dictates that as the rotor turns opposite the stator, the actual distances travelled by transmissions from either side will oscillate within a certain range. This oscillation in path length will lead to Doppler shifts which, although in most cases they would be undetectable, might cause problems for very high frequency transmission applications.

By using the ellipsoidal surfaces in the second embodiment, the path length of the transmissions will be held constant, thus eliminating any possible difficulties associated with the Doppler shift. In the construction of an ellipsoidal based coupler, transmitters would be set at an angle to the central axis of rotation such that the point where the imaginary path of such a transmission intersected the rotational axis would serve as one focus of the ellipsoidal reflective track on the opposite face. The other focus of the ellipsoidal surface would be the receiver point.

In most cases, the circular, concentric, reflective tracks will be cut from concentric cylinders. For high density communication in ellipsoidal couplers, however, since the transmitters must be angled, the circular tracks may be cut from concentric cones whose walls run parallel to the adjacent angled transmitters. The spacing between, and width of, the reflective tracks are determined by the width of the light beam and alignment accuracy between the rotor and stator.

As depicted FIG. 4, one technique for collimating the divergent input signals received from the optical waveguides (such as optical fibers) is to place a collimating lens on each transmitter. Refraction control openings may be required to produce very smooth beam irradiance distribution. This, along with cosmetic surface quality control, eliminates interference patterns, and thus minimizes crosstalk between channels. The collimating lens may be eliminated if the incoming light is collimated before entry.

As the rotor turns about, its signals are reflected from different points on the circular tracks of the stator. To minimize variations in angle of incidence for a convex surface, point of reception should be designated slightly behind the first surface of the receiver lens. Receivers on the stator must be able to receive effectively from any point on their designated tracks, so the receiver lenses are anti-reflective (AR) coated. Some of the commercially available coatings may reduce external reflectivity of a flat surfce to within the order of 0.1% across the incident range from 0 degrees to about 30 degrees, allowing up to 60 degrees between opposite ends of the circular tracks relative to their receivers (the receivers are directed toward the center of the cone swept by transmissions as the rotor turns). Within this cone, the reflectivity curve is essentially level. This low and flat reflectivity curve ensures high coupling efficiency and low modulation intensty (due to motion).

If the nature of the signals is digital instead of analog, then this angle may be considerably increased. Naturally, analog signals should be assigned to innermost reflective tracks to minimize the variations in angle of incidence. Cyclic modulation of intensity caused by variations in angle of incidence may be restricted below −60 dB. It is preferable that all surfaces inside the coupler (excepting the reflective tracks) should be AR coated.

Regardless of all these options of moving parts, the principle is the same: the alignment requirements are drastically reduced and efficiency is considerably increased if paraboloidal or ellipsoidal reflective surfaces are used to focus off-axis light beams to the focal point of the reflective surface in such a way that the light beams always enter parallel to the axis of the paraboloidal mirrors; in the case of ellipsoidal mirrors, the light beams are directed as though they emanate from a real or imaginary point source where one of the ellipsoidal mirror focal points is located.

Although there have been shown and described hereinabove specific arrangements of a rotary optical coupler in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

What is claimed is:

1. A rotary optical coupler comprising:
   first and second members coupled together by bearing means which permit relative rotation between the members about a central axis,
      each of said members having a generally cylindrical cup-shaped housing closed at one end remote from the bearing means by a transverse base plate;
   sealing means mounted adjacent the bearing means between the open ends of the respective cylindrical housings for sealing the juncture between the two members adjacent the bearing means;
   a first plurality of optical radiation source elements mounted at selected positions in the base plate of the first member, said optical radiation source elements being directed inwardly to transmit optical radiation toward the base plate of the second member;
   a second plurality of optical radiation source elements mounted at selected positions in the base plate of the second member, said optical radiation source elements being directed inwardly to transmit optical radiation toward the base plate of the first member;
   a first plurality of reflective ring elements mounted at selected positions in the base plate of the first member;
   a second plurality of reflective ring elements mounted at selected positions in the base plate of the second member;
   a first plurality of optical receivers mounted at selected positions displaced from each other about an inner peripheral wall portion of the housing of the first member; and
   a second plurality of optical receivers mounted at selected positions displaced from each other about an inner peripheral wall portion of the housing of the second member;
      each individual ring element of the first and second pluralities of reflective ring elements being disposed to reflect optical radiation from a corresponding optical radiation source element to a corresponding receiver, regardless of the extent of relative rotation between the two members.

2. The apparatus of claim 1 wherein said sealing means comprise a plurality of sealing surfaces in the form of a succession of concentric circumferential rings arranged in sequence between the inside and outside of said housings, a ferromagnetic fluid situated adjacent said surfaces, and a plurality of magnets for magnetizing said fluid in the vicinity of said surfaces.

3. The apparatus of claim 1 wherein each of said ring elements has a reflective end edge which is beveled at a predetermined angle to cause optical radiation from the corresponding optical radiation source element to be reflected toward the corresponding optical radiation receiver, regardless of the rotational position of the optical radiation source element about said central axis.

4. The apparatus of claim 3 wherein said optical radiation source elements are respectively interspersed between adjacent reflective ring elements in each of said first and second members.

5. The apparatus of claim 4 wherein each of said ring elements is axially aligned with the position of an optical radiation source element mounted in the base plate which is opposite the base plate in which said ring element is mounted.

6. The apparatus of claim 3 wherein the bevel angle of the end edge of a ring element corresponds to the surface of a portion of a paraboloid.

7. The apparatus of claim 6 wherein the ring elements of said first and second pluralities of reflective ring elements are fabricated as a set of right circular cylindrical ring segments of a block having a concave paraboloid reflective surface, all of said ring segments being fabricated as concentric cylindrical portions of said block.

8. The apparatus of claim 7 wherein the first and second pluralities of reflective ring elements constitute alternating segments of said set of right circular cylindrical segments formed from said block.

9. The apparatus of claim 8 wherein each ring element of a given plurality of reflective ring elements is mounted at a circumferential angle which is shifted about said central axis by a displacement angle which is different from the angle of each other ring element in said plurality.

10. The apparatus of claim 9 wherein said displacement angle is selected to correlate with the position of a receiver associated with said individual ring element.

11. The apparatus of claim 3 wherein the bevel angle of the end edge of a ring element corresponds to the surface of a portion of an ellipsoid.

12. The apparatus of claim 11 wherein the ring elements of said first and second pluralities of reflective ring elements are fabricated as cylindrical ring segments of a block having a concave ellipsoidal reflective surface, all of said ring segments being fabricated as concentric cylindrical portions of said block.

13. The apparatus of claim 1 wherein each of said optical radiation sources comprises the termination of an optical waveguide, and wherein the optical waveguides of all of said sources are integrated together in a transmission cable.

14. The apparatus of claim 13 wherein each of said receivers includes an optical waveguide coupling which is connected to a corresponding optical waveguide.

15. The apparatus of claim 1 wherein each of said optical receivers comprises a light sensor.

16. A set of rings for directing light from a collimated light beam source to a plurality of selectively positioned optical receivers comprising:
a plurality of cylindrical ring segments, each having a reflective edge having a continuously variable edge angle along the extent of the end of the cylinder which serves to direct light reflected from said collimated beam to a predetermined point location, each of said rings being positioned to direct light from said beam to a different point location.

17. The apparatus of claim 16 wherein each of said rings is cut from a geometric figure having a concave surface having a geometric shape defined by a focal point.

18. The apparatus of claim 7 wherein each of the rings of said set is cut from said geometric shape as concentric rings surrounding a central axis.

19. The apparatus of claim 18 wherein each of said rings is mounted on a base plate as concentric rings about a common central axis.

20. The apparatus of claim 19 wherein each of said rings is mounted with a selected angular rotation about said central axis which is different from that of the other rings of said set so as to direct light which is incident on the reflective edge of each ring to a different one of said optical receivers positioned at different angles about said central axis.

21. The apparatus of claim 17 wherein said geometric figure is a paraboloid.

22. The apparatus of claim 17 wherein said geometric figure is an ellipsoid.

23. The method of fabricating a set of ring reflectors having the capability of directing reflected light from an incident beam to different point locations for each different ring comprising the steps of:
cutting a series of rings from a geometric figure having a concave reflective surface such that each of said rings constitutes a right circular cylinder having a reflective edge at one end of the cylinder, said edge being beveled at a continuously variable angle about the circumferential edge of said cylinder, the angle at any point on said edge being such as to direct light reflected from that ring to the same point location; and
orienting the rings of said set on a base member with an orientation such that light from an incident beam is reflected toward a plurality of point locations generally positioned at different selected rotational angles about the periphery of said base member with said selected angles being different for the respective rings.

24. The method of claim 23 wherein the step of orienting the rings comprises rotating each ring about a central axis by a predetermined angle which is different for each different ring.

25. The method of claim 23 wherein the step of cutting said rings from a geometric figure comprises cutting them from a block having a concave paraboloidal surface.

26. The method of claim 23 wherein the step of cutting said rings from a geometric figure comprises cutting them from a block having a concave ellipsoidal surface.

* * * * *